United States Patent
Park et al.

(10) Patent No.: US 11,767,877 B2
(45) Date of Patent: Sep. 26, 2023

(54) PLUNGING ASSEMBLY FOR DRIVESHAFT

(71) Applicant: ERAE AMS CO., LTD., Daegu (KR)

(72) Inventors: Se Jung Park, Daegu (KR); Dal Soo Jang, Daegu (KR); Do Hyun Kim, Daegu (KR)

(73) Assignee: ERAE AMS CO., LTD., Daegu (KR)

( * ) Notice: Subject to any disclaimer, the term of this patent is extended or adjusted under 35 U.S.C. 154(b) by 497 days.

(21) Appl. No.: 16/963,590

(22) PCT Filed: Jan. 14, 2019

(86) PCT No.: PCT/KR2019/000515
§ 371 (c)(1),
(2) Date: Jul. 21, 2020

(87) PCT Pub. No.: WO2019/143079
PCT Pub. Date: Jul. 25, 2019

(65) Prior Publication Data
US 2021/0062860 A1   Mar. 4, 2021

(30) Foreign Application Priority Data
Jan. 22, 2018  (KR) .................. 10-2018-0007503

(51) Int. Cl.
*F16C 3/035*    (2006.01)
*B60B 35/14*    (2006.01)
(Continued)

(52) U.S. Cl.
CPC .............. *F16C 3/035* (2013.01); *B60B 35/14* (2013.01); *B60B 35/18* (2013.01); *F16D 3/065* (2013.01);
(Continued)

(58) Field of Classification Search
CPC ...... F16C 3/035; F16C 2326/06; B60B 35/14; B60B 35/18; F16D 3/065; Y10T 403/15
(Continued)

(56) References Cited

U.S. PATENT DOCUMENTS 6,217,455 B1 *   4/2001   Yanata ................... A01B 71/06
6,348,002 B1 *   2/2002   Breese .................... F16D 3/387
(Continued)

FOREIGN PATENT DOCUMENTS

FR   2 838 093 A1   10/2003
JP      8-4747 A     1/1996
(Continued)

OTHER PUBLICATIONS

International Search Report for PCT/KR2019/000515 dated Apr. 15, 2019 [PCT/ISA/210].
(Continued)

*Primary Examiner* — Greg Binda
(74) *Attorney, Agent, or Firm* — Sughrue Mion, PLLC (57) ABSTRACT

A plunging assembly of a driveshaft includes: an outer housing having a bore having a plurality of outer ball grooves extending in a longitudinal direction; an inner shaft being disposed to be able to undergo relative movement in the longitudinal direction in the bore of the outer housing and having a plurality of inner ball grooves that are paired respectively with the outer ball grooves to form a plurality of ball tracks; a plunging unit connecting the outer housing and the inner shaft to allow a plunging motion and a rotational power transmission between the outer housing and the inner shaft; and a stopper that is provided in the bore of the outer housing to limit relative movement of the inner housing and the inner shaft in a direction in which the inner shaft is inserted into the bore. The outer housing has a mounting hole communicating with the bore, and the stopper is a plug member that is inserted into the mounting hole in a state that a frontal end portion thereof is exposed to the bore.

14 Claims, 7 Drawing Sheets

(51) Int. Cl.
  *B60B 35/18* (2006.01)
  *F16D 3/06* (2006.01)

(52) U.S. Cl.
  CPC ......... *F16C 2326/06* (2013.01); *Y10T 403/15* (2015.01)

(58) Field of Classification Search
  USPC .............................................. 464/167; 384/49
  See application file for complete search history.

(56) References Cited

U.S. PATENT DOCUMENTS

| | | | |
|---|---|---|---|
| 6,585,602 B2 | 7/2003 | Cermak et al. | |
| 6,793,583 B2 * | 9/2004 | Welschof | F16D 3/845 464/167 |
| 8,157,660 B2 * | 4/2012 | Disser | F16D 3/065 464/167 |

FOREIGN PATENT DOCUMENTS

| | | |
|---|---|---|
| JP | 2863114 B2 | 3/1999 |
| JP | 3464460 B2 | 11/2003 |
| JP | 2010-534798 A | 11/2010 |
| JP | 2011-73543 A | 4/2011 |
| JP | 2016-020146 A | 2/2016 |
| JP | 2017-109529 A | 6/2017 |
| KR | 10-2010-0079270 A | 7/2010 |
| KR | 10-1419986 B1 | 7/2014 |
| KR | 10-1637850 B1 | 7/2016 |
| KR | 10-2017-0142735 A | 12/2017 |

OTHER PUBLICATIONS

Office Action dated Jun. 1, 2023 in Japanese Application No. 2020-540544.
Extended European Search Report dated Aug. 27, 2021 in European Application No. 19741163.0.
Office Action dated Dec. 30, 2021 in Chinese Application No. 201980009701.2.

* cited by examiner

PLUNGING ASSEMBLY FOR DRIVESHAFT

CROSS REFERENCE TO RELATED APPLICATIONS

This application is a National Stage of International Application No. PCT/KR2019/000515 filed Jan. 14, 2019, claiming priority based on Korean Patent Application No. 10-2018-0007503 filed Jan. 22, 2018.

TECHNICAL FIELD

The present invention relates to a plunging assembly of a driveshaft used in a drive system of a vehicle and a drive shaft comprising the same.

BACKGROUND ART

A drive shaft used in a drive line of a vehicle includes an intermediate shaft and constant velocity joints installed on both sides thereof.

Such a drive shaft includes a drive shaft in which an intermediate shaft is configured as a plunging assembly capable of plunging.

A plunging assembly is generally implemented in the form of a plunging shaft using a ball spline structure. Such a plunging assembly includes a tubular outer housing, an inner shaft and a plunging unit. The plunging unit is interposed between the outer housing and the inner shaft to enable a plunging operation. Ball grooves that are mated to each other are respectively provided in the outer housing and the inner shaft, and the plunging unit includes balls disposed in these ball grooves and a ball cage receiving the balls.

It is necessary to limit the behavior of the plunging unit and the behavior of the inner shaft in a plunging assembly having such a plunging unit, and for example, U.S. Pat. No. 6,585,602 discloses such a plunging assembly. The plunging assembly of the conventional driveshaft has a plurality of stop rings to limit the behavior of the plunging unit and the inner shaft, and in particular has a structure in which stop rings are provided at both ends of the inner shaft. In this case, there is a problem in that the structure is complicated and machining is difficult because grooves for seating of the stop ring at both ends of the inner shaft must be formed.

In particular, a groove that is formed to mount a stop ring on the proximal side of the inner shaft causes a problem that the inner shaft can be broken even at a small torsional torque.

PRIOR DOCUMENTS

1. U.S. Pat. No. 6,585,602 (date of registration: 2003 Jul. 1)
2. JP patent No. 3464460 (date of registration: 2003 Aug. 22)
3. JP patent No. 2863114 (date of registration: 1998 Dec. 11)

DETAILED DESCRIPTION OF THE INVENTION

Technical Problem

The problem to be solved by the present invention is to provide a plunging assembly capable of implementing a stop function of an inner shaft without decreasing a strength of an inner shaft.

Technical Solution

A plunging assembly of a driveshaft according to an embodiment of the present invention includes: an outer housing having a bore having a plurality of outer ball grooves extending in a longitudinal direction; an inner shaft being disposed to be able to undergo relative movement in the longitudinal direction in the bore of the outer housing and having a plurality of inner ball grooves that are paired respectively with the outer ball grooves to form a plurality of ball tracks; a plunging unit connecting the outer housing and the inner shaft to allow a plunging motion and a rotational power transmission between the outer housing and the inner shaft; and a stopper that is provided in the bore of the outer housing to limit relative movement of the inner housing and the inner shaft in a direction in which the inner shaft is inserted into the bore. The outer housing has a mounting hole communicating with the bore, and the stopper is a plug member that is inserted into the mounting hole in a state that a frontal end portion thereof is exposed to the bore.

The outer housing may have a through hole communicating with the bore and the mounting hole may be formed by further processing the through hole. The plug member may be fitted in contact with a side surface forming the mounting hole.

The plug member may be assembled to the mounting hole in a press-fitting manner.

The plug member may include an O-ring that is inserted into a groove formed on an outer peripheral surface thereof, and the O-ring may be in close contact with the side surface of the mounting hole.

The O-ring may be provided in plural.

The plug member may include an annular projection protruding from an outer peripheral surface thereof, and the annular projection may be in close contact with the side surface of the mounting hole.

The annular projection may be provided in plural.

The plug member may be provided with a recessed space recessed in a longitudinal direction from an end facing the inner shaft.

The plug member may include an elastic damper that is fastened to a portion facing an end of the inner shaft.

The elastic damper may include: a shock absorbing portion facing an end of the inner shaft and absorbing a shock when colliding with the inner shaft; an extension portion extending along a side surface of the plug member at an outer end of the shock absorbing portion; and a fastening protrusion extending in an inward direction from an end of the extension portion and inserted into a fastening groove formed in an outer circumferential surface of the plug member.

The outer housing may have an inclined surface connecting the bore and the mounting hole. The plug member may include: a shock absorbing portion located in the bore; a fastening portion inserted into the mounting hole; and a connecting portion connecting the shock absorbing portion and the fixing portion. An outer peripheral surface of the connecting portion may be formed to be inclined so as to be in close contact with the inclined surface.

The outer housing may have a through hole communicating with the bore and the mounting hole is formed by further processing the through hole, and the fastening portion may be fitted in contact with a side surface forming the mounting hole.

The fastening portion may be assembled to a space formed by a mounting surface in a press-fitting manner.

The fastening portion may include an annular projection protruding from an outer peripheral surface, and the annular projection may be in close contact with the mounting surface.

The annular projection may be provided in plural.

The plug member may be provided with a recessed space recessed in a longitudinal direction from an end facing the inner shaft.

A plunging assembly of a driveshaft according to another embodiment of the present invention includes: an outer housing having a bore having a plurality of outer ball grooves extending in a longitudinal direction; an inner shaft being disposed to be able to undergo relative movement in the longitudinal direction in the bore of the outer housing and having a plurality of inner ball grooves that are paired respectively with the outer ball grooves to form a plurality of ball tracks; a plunging unit connecting the outer housing and the inner shaft to allow a plunging motion and a rotational power transmission between the outer housing and the inner shaft; and a movement limiting unit configured to limit a longitudinal movement of the plunging unit and a relative movement of the outer housing and the inner shaft in a longitudinal direction.

The movement limiting unit includes: a first moving-in stopper for limiting a relative movement of the plunging unit in an insertion direction into the bore; a second moving-in stopper for limiting a relative movement of the outer housing and the inner shaft in a direction in which the inner shaft is inserted into the bore; a first moving-out stopper for limiting a relative movement of the plunging unit in a discharge direction out of the bore; and a second moving-out stopper for restricting a relative movement of the inner housing and the inner shaft in a direction in which the inner shaft is discharged out of the bore. The outer housing has a mounting hole communicating with the bore, and the second moving-in stopper is a plug member that is inserted into the mounting hole in a state that an end portion thereof is exposed to the bore.

Effect of the Invention

According to the present invention, by forming a mounting hole connected to a bore of an outer housing and implementing a stop function of an inner shaft via a plug member inserted therein, a stop function of the inner shaft is realized without damaging the strength of the inner shaft. In addition, leakage of grease can be prevented by an O-ring or an annular projection provided on an outer peripheral surface of a plug member.

Further, according to the present invention, by attaching an elastic damper to an end of the plug member, it is possible to reduce the impact that may occur during collision with the inner shaft.

In addition, according to the present invention, by forming a slanted surface connecting a bore of the outer housing and the mounting hole and forming a connecting portion that is inclined so as to be in close contact with the inclined surface, it is possible to effectively prevent the plug member from being moved by being pushed by the inner shaft.

DETAILED DESCRIPTION OF THE EMBODIMENTS

Hereinafter, exemplary embodiments of the present invention will be described in detail with reference to the accompanying drawings.

Figure 1:
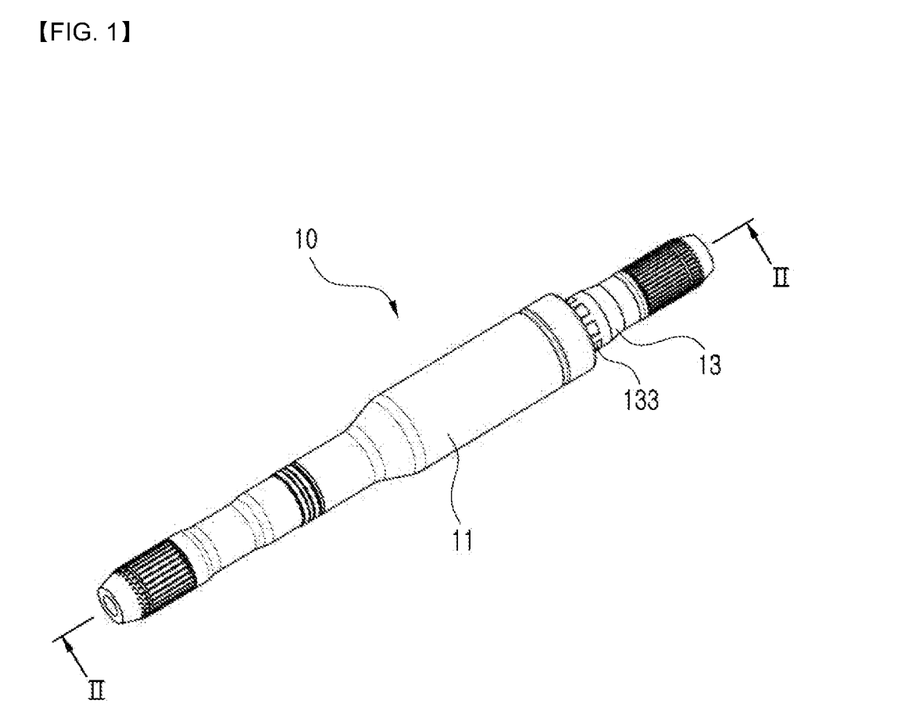
FIG. 1 is a perspective view of a plunging assembly of a driveshaft according to an embodiment of the present invention.
Figure 2:
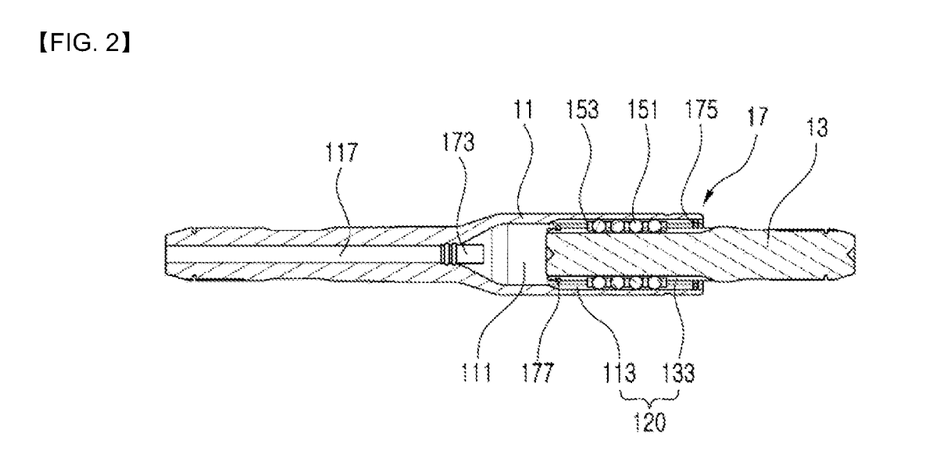
FIG. 2 is a cross-sectional view taken along a line II-II of FIG. 1.

Referring to FIG. 1 and FIG. 2, a plunging assembly 10 includes an outer housing 11, an inner shaft 13 and a plunging unit 15. The outer housing 11 may have a tube shape having a through hole along a longitudinal direction thereof, and the inner shaft 13 may be partially inserted into the outer housing 11. The plunging unit 15 is interposed between the outer housing 11 and the inner shaft 13 so that a plunging operation can occur. Constant velocity joints for transmitting torque may be coupled to both ends exposed to both sides in the state that the outer housing 11 and the inner shaft 13 are assembled to one another. For example, the constant velocity joint may be a Rzeppa joint capable of transmitting rotational power and being articulated. The outer housing 11, the inner shaft 13 and a pair of constant velocity joints coupled to the both sides thereof according to an embodiment of the present invention may comprise a driveshaft used in a drive system of a vehicle.

The outer housing 11 has a bore 111 extending in a longitudinal direction thereof (horizontal direction in FIG. 3), and the bore 111 has a plurality of outer ball grooves 113 extending in the longitudinal direction. The outer ball groove 113 may be formed by being recessed in a radially outward direction from a surface forming the bore 111 and may have a semi-circular cross-sectional shape. The outer ball groove 113 may extend in a predetermined length from an end of the open side of the outer housing 11. The plurality of the outer ball grooves 113 may be arranged at equal intervals along a circumferential direction.

The inner shaft 13 is inserted into the bore 111 of the outer housing 11 to be relatively movable in a longitudinal direction. That is, the outer housing 11 and the inner shaft 13 are arranged so that relative positions in the longitudinal direction with respect to each other are variable. For example, when the inner shaft 13 is connected to an inner joint member of an in-board joint of a driveshaft of a vehicle, the relative position of the outer housing 11 and the inner shaft 13 can be changed while the position in a longitudinal direction of the outer housing 11 in is changed.

The inner shaft 13 is provided with a plurality of inner ball grooves 133 which are respectively paired with a plurality of outer ball grooves 113 of the outer housing 11 to form a plurality of ball tracks 120. The inner ball groove 133 may be formed by being recessed in a radially inward direction from the surface of the inner shaft 13 and may have a semi-circular cross-sectional shape. The inner ball groove 133 may be formed at a position corresponding to the position of the outer ball groove 113 so as to form the tubular ball track 120. At this time, the inner ball groove 133 may extend a predetermined length from the tip of the inner shaft 13 inserted into the bore 111 of the outer housing 11.

The plunging unit 15 connects the outer housing 11 and the inner shaft 13 to allow a plunging motion and a rotational power transmission between the outer housing 11 and the inner shaft 13. That is, due to the plunging unit 15, the relative movement in the longitudinal direction of the outer housing 11 and the inner shaft 13 is possible, and the delivery of the rotational power, i.e., the torque, between the inner shaft 13 and the outer housing 11 is also possible.

The plunging unit 15 includes a plurality of balls 151 and a ball cage 153 accommodating them. A plurality of balls 151 may be arranged in a line in each ball track 120, and for example, four balls 151 may be disposed in each ball track 120, as exemplarily shown in FIG. 2. The ball spline structure is formed by the combination of the plunging unit 15 and the ball track 120.

The ball cage 153 accommodates the ball 151 and is interposed between the inner shaft 13 and the outer housing 11 to be movable in a longitudinal direction. For example, the ball cage 153 may include a plurality of ball pockets 154 for receiving a plurality of balls, respectively. As shown in FIG. 2, a radially outer portion of the ball 151 is disposed in the outer ball groove 113 and a radially inner portion of the ball 151 is disposed in the inner ball groove 133 in a state that the center portion of the ball 151 is located in the ball pocket 154. At this time, the ball cage 153 may have a shape of a cylindrical sleeve.

For example, when the inner shaft 13 rotates, the rotational power is transferred from the inner shaft 13 to the outer housing 11 via the balls 151 that are in close contact with the side of the inner ball groove 133 of the inner shaft 13 and the outer ball groove 113 of the outer housing 11. In addition, when there is a relative movement in the longitudinal direction of the outer housing 11 and the inner shaft 13, the ball 151 rolls or slides to undergo a change of the relative positions with respect to the outer housing 11 and/or the inner shaft 13.

A movement limiting unit 17 is provided that operates to limit the longitudinal movement of the plunging unit 15 and the relative movement of the outer housing 11 and the inner shaft 13 in the longitudinal direction. The movement limiting unit 17 may include a first moving-in stopper 171, a second moving-in stopper 173, a first moving-out stopper 175 and a second moving-out stopper 177.

Figure 3:
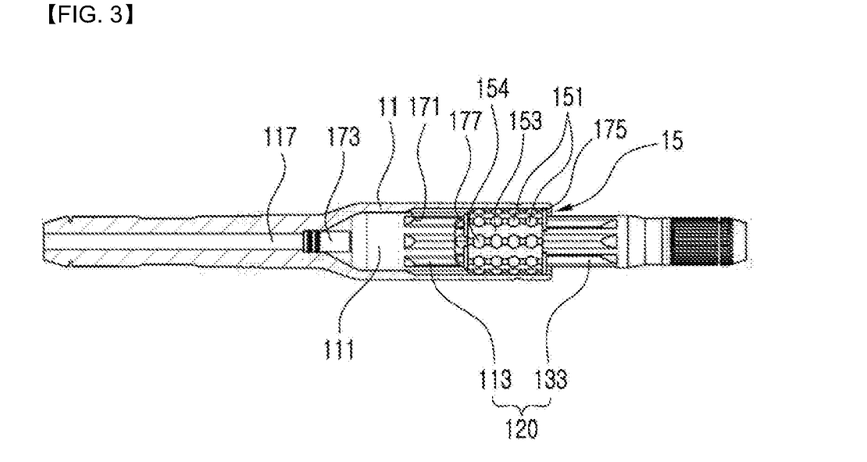
FIG. 3 is a drawing for explaining a moving-out operation of an outer housing and an inner shaft in a plunging assembly according to an embodiment of the present invention.

The first moving-out stopper 175 limits the relative movement of the plunging unit 15 in the direction in which the plunging unit 15 is discharged out of the bore 111. As shown in FIG. 3, the first moving-out stopper 175 is a stop ring inserted into a groove formed in an inner circumferential surface of an open side end portion of the outer housing 11 into which the inner shaft 13 is inserted. The ball cage 153 or the ball 151 of the plunging unit 15 may be formed to be blocked by the stop ring 175. When the ball cage 153 contacts the stop ring 175 when the ball cage 153 moves relative to the outer housing 11 in the direction discharged from the bore 111, the relative movement of the plunging unit 15 is prevented. Relative movement of the plunging unit 15 in the direction exiting the bore 111 may be caused by the movement of the outer housing 11 in the left direction in FIG. 2.

The second moving-out stopper 177 limits the relative movement of the inner shaft 13 in the direction in which the inner shaft 13 is discharged out of the bore 111. As illustrated in FIG. 3, the second moving-out stopper 177 may be a stop ring installed in a groove formed at the frontal end portion of the inner shaft 13. The ball cage 153 or the ball 151 of the plunging unit 15 may be formed to be blocked by the stop ring 177. When the outer housing 11 and the inner shaft 13 move relative to each other in the direction in which the inner shaft 13 is discharged out of the bore 111, the stop ring 177 is blocked against the plunging unit 15 that is blocked by the stop ring 175, and thereby the inner shaft 13 can no longer move relatively. Relative movement of the inner shaft 13 in the direction exiting from the bore 111 may be caused by the movement of the outer housing 11 in the left direction in FIG. 3.

FIG. 3 illustrates the state that the inner shaft 13 is maximally discharged out of the outer housing 11, and in this state the ball cage 153 is blocked by the first moving-out stopper 175 and the second moving-out stopper 177 is blocked by the ball cage 153. Therefore, an additional moving-out motion is blocked.

Figure 4:
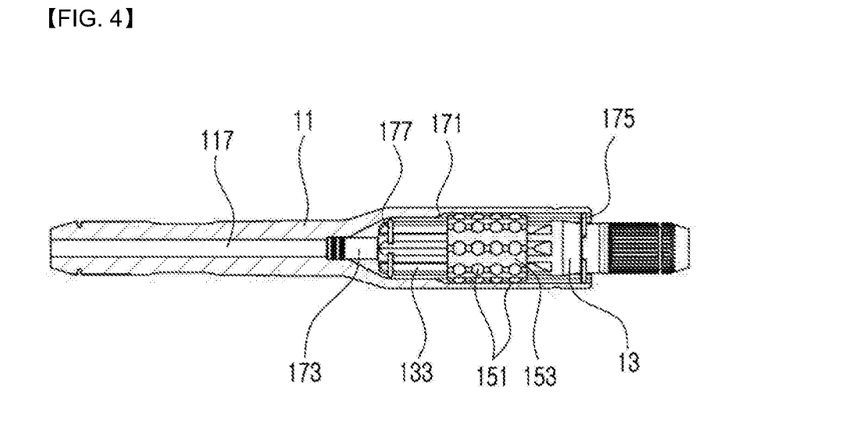
FIG. 4 is a drawing for explaining a moving-in operation of an outer housing and an inner shaft in a plunging assembly according to an embodiment of the present invention.

The first moving-in stopper 171 limits the relative movement of the plunging unit 15 in the direction in which the plunging unit 15 is inserted into the bore 111. As shown in FIG. 4, the first moving-in stopper 171 may be a blocking wall which is protruded in a radially inward direction from the inner end of the outer ball groove 113 of the outer housing 11. The ball cage 153 or the ball 151 of the plunging unit 15 may be formed to be blocked by the blocking wall 171. When the plunging unit 15 moves relatively in a direction in which it is inserted into the bore 111, the plunging unit 15 is prevented from moving further if the plunging unit 15 contacts the blocking wall 171. The relative movement of the plunging unit 15 in the direction in which it is inserted into the bore 111 can be caused by the movement of the outer housing 11 in the right direction in FIG. 2.

The second moving-in stopper 173 limits the relative movement of the inner shaft 13 in the direction in which it is inserted into the bore 111. As illustrated in FIG. 4, the second moving-in stopper 173 may be a plug member installed in the outer housing 11. At this time, the outer housing 11 may include a mounting hole 115 communicating with the bore 111, and the plug member 173 is inserted into the mounting hole 115 in a state in which the front end portion (right end portion in FIG. 2) is exposed to the bore 111. Accordingly, if the inner shaft 13 moves relatively in an insertion direction within the bore 111 to contact the plug member 173 as illustrated in FIG. 4, further movement of the inner shaft 13 is blocked.

The outer housing 11 may be provided with a through hole 117 communicating with the bore 111, and the mounting hole 115 may be formed by further processing a side surface of the through hole 117. For example, as shown in (a) of FIG. 5, the mounting hole 115 may be formed by further cutting a region of the side surface of the through hole 117 of the outer housing 11 where the plug member 173 is inserted. Accordingly, a blocking wall 118 is formed at an end of the mounting hole 115. Then, as shown in (b) of FIG. 5, the plug member 173 is inserted into the mounting hole 115, and the inner shaft 13 can be inserted into the bore 111.

Figure 5:
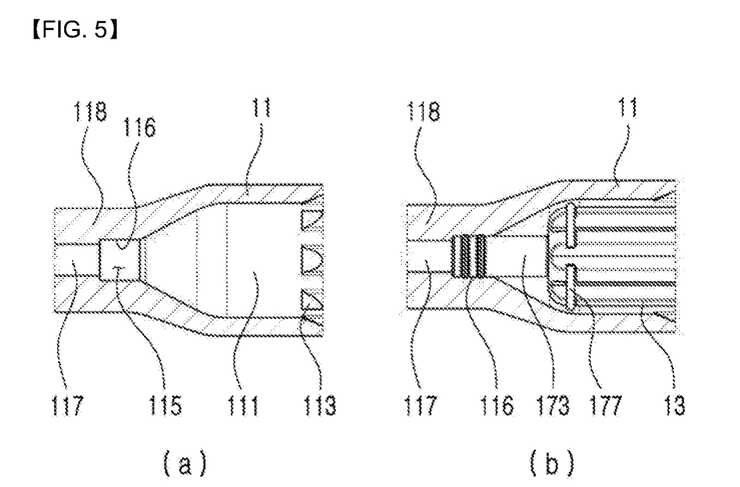
FIG. 5 is a view for explaining a process of installing a plug member in an outer housing of a plunging assembly according to an embodiment of the present invention.

At this time, the plug member 173 may be assembled to the mounting hole 115 in a press-fitting manner so as not to be separated from the mounting hole 115. For example, the plug member 173 may be formed of a shock-resistant metal material such as aluminum. With the plug member 173, the inner shaft 13 can be prevented from directly colliding with the inner surface of the outer housing 11 during moving-in motion.

Figure 6:
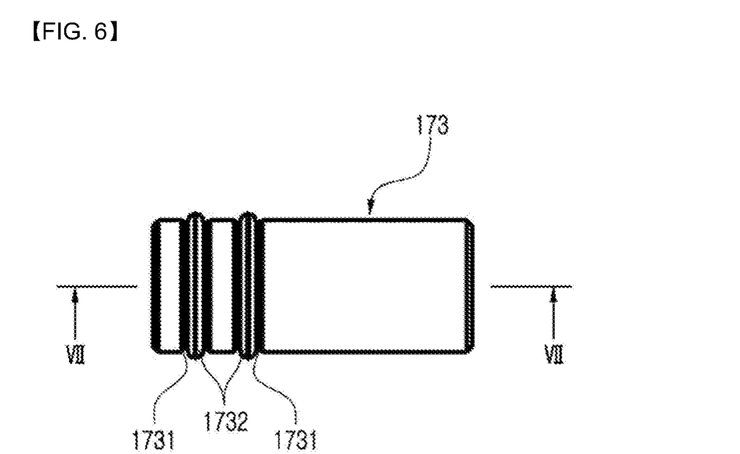
FIG. 6 is a drawing showing a plug member of a plunging assembly according to an embodiment of the present invention.
Figure 7:
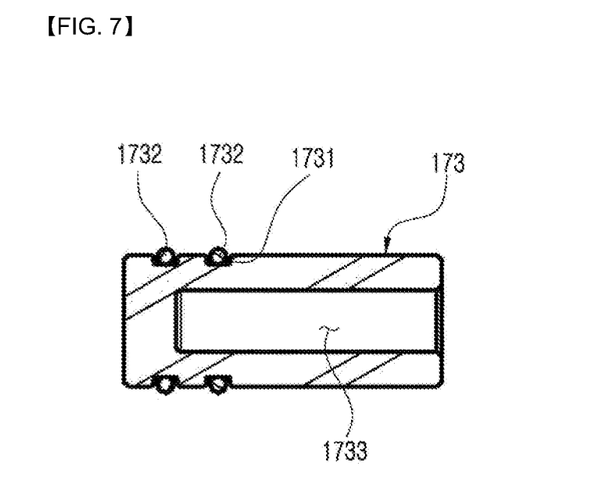
FIG. 7 is a cross-sectional view taken along a line VII-VII of FIG. 6.

Referring to FIG. 6 and FIG. 7, the plug member 173 may have a substantially cylindrical shape, and an O-ring 1732 may be installed in a groove 1173 that is formed on an outer circumferential surface of the plug member 173. It is preferable that grease is applied for smooth movement of the ball 151 of the plunging unit 15, and the O-ring 1732 can prevent the applied grease from leaking to the outside through the through hole 117 of the outer housing 11. At this time, a plurality of O-rings 1732 may be provided, and for example, as illustrated in FIG. 6 and FIG. 7, two O-rings 1732 may be provided. By providing a plurality of O-rings 1732, the assembled plug member 173 can maintain a predetermined arrangement state.

Further, as shown in FIG. 7, the plug member 73 may be provided with a recessed space 1733 that is recessed in a longitudinal direction from the front end thereof facing the inner shaft 13. The weight of the plug member 73 may be reduced due to the recessed space 1733.

Hereinafter, a plug member according to another embodiment of the present invention will be described with reference to FIG. 8 and FIG. 9. The same reference numerals are used for the same parts as described above, and the common descriptions will be omitted.

Figure 8:
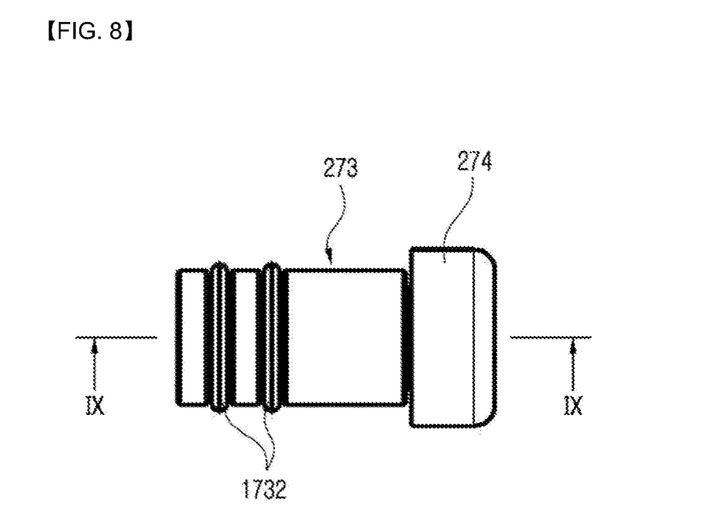
FIG. 8 is a view showing a plug member according to another embodiment of the present invention.
Figure 9:
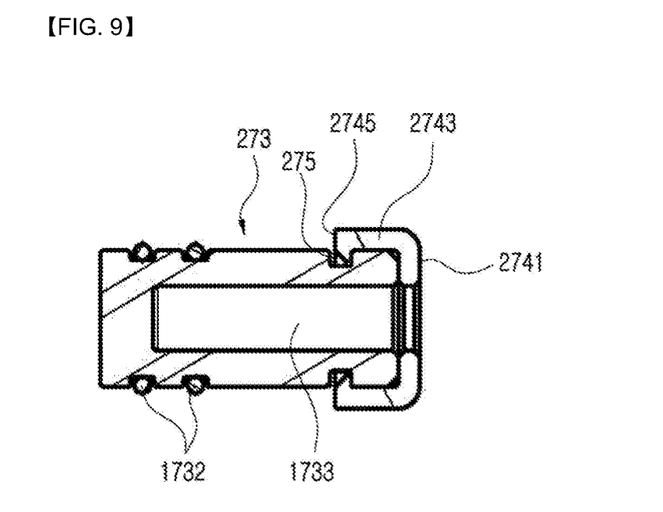
FIG. 9 is a cross-sectional view taken along a line IX-IX of FIG. 8.

Referring to FIG. 8 and FIG. 9, a plug member 273 includes an elastic damper 274 that is fastened to a portion facing an end of the inner shaft 13. Referring to FIG. 9, the elastic damper 274 includes a shock absorbing portion 2741 that faces an end portion of the inner shaft 13, an extension portion 2743 that extends along the side of the plug member 273 from the outer end of the shock absorbing portion 2741, and a fastening protrusion 2745 that extends in a radially inward direction from an end of the extension portion 2743 and is inserted into a fastening groove 275 that is formed on the outer circumferential surface of the plug member 273. The shock absorbing portion 2741 is a portion where the end of the inner shaft 13 collides and functions to absorb shock in the event of the collision with the inner shaft 13. The elastic damper 274 may be assembled to the plug member 273 in a press-fitting manner.

Hereinafter, a plug member according to another embodiment of the present invention will be described with reference to FIG. 10. The same reference numerals are used for the same parts as described above, and the common descriptions are omitted.

Figure 10:
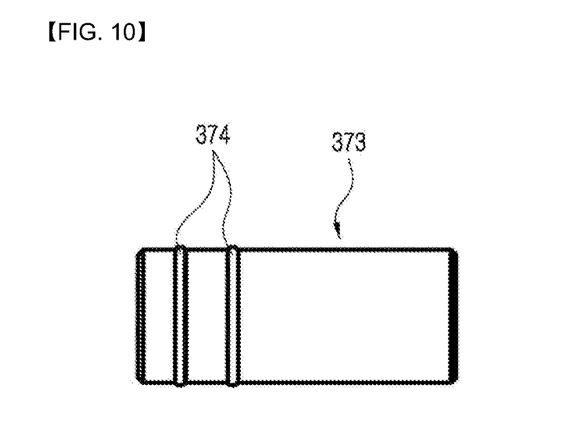
FIG. 10 is a drawing showing a plug member according to another embodiment of the present invention.

As shown in FIG. 10, a plug member 373 has an annular projection 374 protruding from an outer circumferential surface thereof. The annular projection 374 may be provided in plural, and like the O-ring described above, is in close contact with the side surface 116 of the mounting hole 115 to perform a function of preventing leak of grease.

Hereinafter, a plunging assembly according to another embodiment of the present invention will be described with reference to FIG. 11 to FIG. 13.

Figure 11:
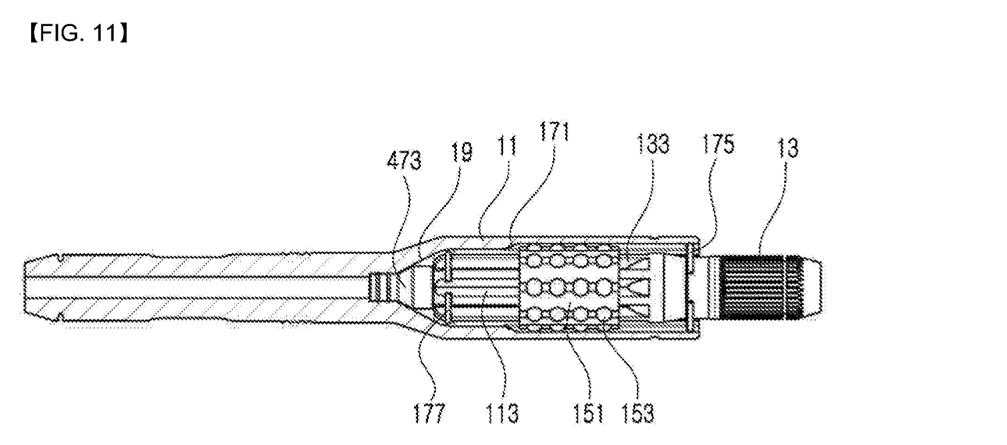
FIG. 11 is a drawing showing a plunging assembly according to another embodiment of the present invention.

Referring to FIG. 11, the outer housing 11 includes an inclined surface 19 connecting the bore 111 and the mounting hole 15, and a plug member 473 is configured to be supported on the inclined surface 19 so as to be more effectively prevented from moving backward by the collision with the inner shaft 13. At this time, the diameter of the mounting hole 115 is formed to be smaller than the diameter of the bore 111, and the inclined surface 19 may have a cone shape that becomes gradually narrower toward an entrance of the mounting hole 15 from an end of the bore 111.

Figure 12:
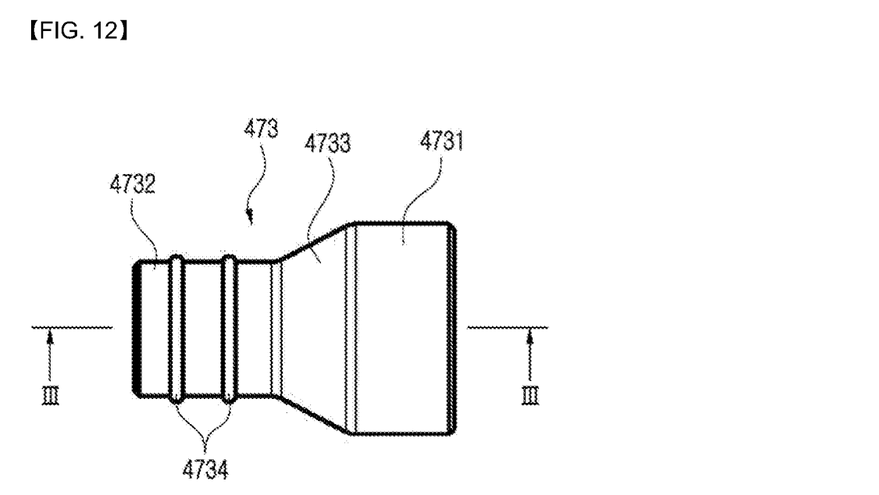
FIG. 12 is a drawing showing a plug member of the plunging assembly of FIG. 11.

As shown in FIG. 11 and FIG. 12, the plug member 473 is provided with a shock absorbing portion 4731 positioned in the bore, a fastening portion 4732 inserted into the mounting hole 115, and a connecting portion 4733 that connects the shock absorbing portion 4731 and the fastening portion 4732. At this time, as shown in FIG. 11, the connecting portion 4733 is formed to be inclined to be in close contact with the inclined surface 19 of the outer housing 11. That is, the connecting portion 473 may be formed in a shape of a cone that becomes gradually narrower toward the fastening portion 4732 from an end of the shock absorbing portion 4711, similar to the inclined surface 19. By this structure, the connecting portion 4733 assists the fastening portion 4732 to prevent the plug member 473 from moving backward. The plug member 473 may be formed of a material having elasticity and corrosion resistance, such as rubber.

Figure 13:
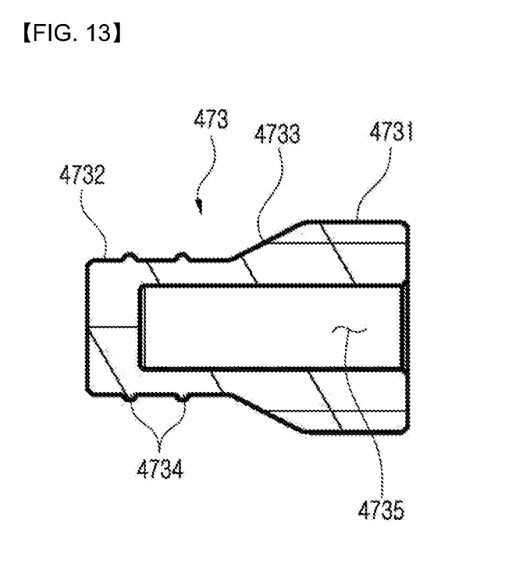
FIG. 13 is a cross-sectional view taken along a ling III-III of FIG. 12.

Meanwhile, as illustrated in FIG. 12 and FIG. 13, the plug member 473 may include an annular projection 4734 that protrudes from an outer circumferential surface thereof. The annular projection 4734 may be provided in plural and is in close contact with the side surface 116 of the mounting hole 115 like the O-ring described above to perform a function of preventing leak of grease.

Also, as shown in FIG. 13, the plug member 473 may include a recessed space 4735 that is recessed in the longitudinal direction at a front end thereof facing the inner shaft 13.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a driveshaft that is used in a drive system of a vehicle, so it has an industrial applicability.

The invention claimed is:
1. A plunging assembly of a driveshaft comprising:
an outer housing having a bore having a plurality of outer ball grooves extending in a longitudinal direction;
an inner shaft being disposed to be able to undergo relative movement in the longitudinal direction in the bore of the outer housing and having a plurality of inner ball grooves that are paired respectively with the outer ball grooves to form a plurality of ball tracks;
a plunging unit connecting the outer housing and the inner shaft to allow a plunging motion and a rotational power transmission between the outer housing and the inner shaft; and a stopper that is provided in the bore of the outer housing to limit relative movement of the outer housing and the inner shaft in a direction in which the inner shaft is inserted into the bore, wherein the outer housing has a mounting hole communicating with the bore, wherein the stopper is a plug member that is inserted into the mounting hole in a state that a frontal end portion thereof is exposed to the bore, wherein the outer housing has an inclined surface connecting the bore and the mounting hole, wherein the plug member comprises:
a shock absorbing portion located in the bore,
a fastening portion inserted into the mounting hole, and
a connecting portion connecting the shock absorbing portion and the fixing portion, and
wherein an outer peripheral surface of the connecting portion is formed to be inclined so as to be in close contact with the inclined surface.

2. The plunging assembly of a driveshaft of claim 1, wherein the outer housing has a through hole communicating with the bore and the mounting hole is formed by further processing the through hole, and wherein the plug member is fitted in contact with a side surface forming the mounting hole.

3. The plunging assembly of a driveshaft of claim 2, wherein the plug member is assembled to the mounting hole in a press-fitting manner.

4. The plunging assembly of a driveshaft of claim 2, wherein the plug member comprises an annular projection protruding from an outer peripheral surface thereof, and wherein the annular projection is in close contact with the side surface of the mounting hole.

5. The plunging assembly of a driveshaft of claim 4, wherein the annular projection is provided in plural.

6. The plunging assembly of a driveshaft of claim 1, wherein the plug member is provided with a recessed space recessed in a longitudinal direction from an end facing the inner shaft.

7. The plunging assembly of a driveshaft of claim 1, wherein the outer housing has a through hole communicating with the bore and the mounting hole is formed by further processing the through hole, and wherein the fastening portion is fitted in contact with a side surface forming the mounting hole.

8. The plunging assembly of a driveshaft of claim 7, wherein the fastening portion is assembled to a space formed by a mounting surface in a press-fitting manner.

9. The plunging assembly of a driveshaft of claim 8, wherein the fastening portion comprises an annular projection protruding from an outer peripheral surface, and
wherein the annular projection is in close contact with the mounting surface.

10. The plunging assembly of a driveshaft of claim 9, wherein the annular projection is provided in plural.

11. The plunging assembly of a driveshaft of claim 1, wherein the plug member is provided with a recessed space recessed in a longitudinal direction from an end facing the inner shaft.

12. A plunging assembly of a driveshaft comprising:
an outer housing having a bore having a plurality of outer ball grooves extending in a longitudinal direction;
an inner shaft being disposed to be able to undergo relative movement in the longitudinal direction in the bore of the outer housing and having a plurality of inner ball grooves that are paired respectively with the outer ball grooves to form a plurality of ball tracks;
a plunging unit connecting the outer housing and the inner shaft to allow a plunging motion and a rotational power transmission between the outer housing and the inner shaft; and
a movement limiting unit configured to limit a longitudinal movement of the plunging unit and a relative movement of the outer housing and the inner shaft in a longitudinal direction, and
wherein the movement limiting unit comprises:
a first moving-in stopper for limiting a relative movement of the plunging unit in an insertion direction into the bore;
a second moving-in stopper for limiting a relative movement of the outer housing and the inner shaft in a direction in which the inner shaft is inserted into the bore;
a first moving-out stopper for limiting a relative movement of the plunging unit in a discharge direction out of the bore; and
a second moving-out stopper for restricting a relative movement of the inner housing and the inner shaft in a direction in which the inner shaft is discharged out of the bore,
wherein the outer housing has a mounting hole communicating with the bore,
wherein the second moving-in stopper is a plug member that is inserted into the mounting hole in a state that an end portion thereof is exposed to the bore,
wherein the outer housing has an inclined surface connecting the bore and the mounting hole,
wherein the plug member comprises:
a shock absorbing portion located in the bore;
a fastening portion inserted into the mounting hole; and
a connecting portion connecting the shock absorbing portion and the fixing portion, and
wherein an outer peripheral surface of the connecting portion is formed to be inclined so as to be in close contact with the inclined surface.

13. The plunging assembly of a driveshaft of claim 12, wherein the outer housing has a through hole communicating with the bore and the mounting hole is formed by further processing the through hole, and wherein the plug member is fitted in contact with a side surface forming the mounting hole.

14. The plunging assembly of a driveshaft of claim 13, wherein the plug member comprises an annular projection protruding from an outer peripheral surface thereof, and wherein the annular projection is in close contact with the side surface of the mounting hole.

* * * * *